US006493948B2

(12) United States Patent
Luegger et al.

(10) Patent No.: US 6,493,948 B2
(45) Date of Patent: Dec. 17, 2002

(54) MOTOR-DRIVEN CHAIN SAW WITH BACK KICK BRAKE AND COASTING BRAKE

(75) Inventors: Johannes Luegger, Hamburg (DE); Carsten Ziegs, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/859,625

(22) Filed: May 17, 2001

(65) Prior Publication Data

US 2002/0002776 A1 Jan. 10, 2002

(30) Foreign Application Priority Data

May 19, 2000 (DE) ........................................ 200 09 070

(51) Int. Cl.$^{7}$ .......................... B27B 17/00; F16D 49/04
(52) U.S. Cl. ......................... 30/382; 30/381; 188/77 W
(58) Field of Search .......................... 30/381, 382, 383; 188/77 R, 77 W, 166

(56) References Cited

U.S. PATENT DOCUMENTS 4,594,780 A * 6/1986 Schliemann et al. .......... 30/382
4,683,660 A * 8/1987 Shurr .......................... 30/382
5,813,123 A * 9/1998 Wieland et al. ............... 30/382

* cited by examiner

*Primary Examiner*—Hwei-Slu Payer
(74) *Attorney, Agent, or Firm*—McCormick, Paulding & Huber LLP

(57) ABSTRACT

In order to design a motor chain saw with a chain brake device releasable as a back kick brake and as a coasting brake comprising a tension lever (2), movable with respect to the housing of the motor chain saw, which can be moved between a brake position (B) and a ready position (b), a release lever (19) which can take up a coasting brake position (A) and a disengaging position (f), in combination with a supplementary brake device known as a coasting brake, it is proposed that the tension lever (2) is placed linearly slidingly movable with respect to the housing of the motor chain saw and that the release lever (1) is placed slidingly movable with respect to the tension lever (2), whereby both axles of the sliding movement are parallel to each other.

5 Claims, 4 Drawing Sheets

MOTOR-DRIVEN CHAIN SAW WITH BACK KICK BRAKE AND COASTING BRAKE

FIELD OF THE INVENTION

This invention relates to a motor-driven chain saw with a chain brake device releasable as a back kick brake and as a coasting brake comprising

- a tension lever movable with respect to the housing of the motor chain saw which can be moved between a brake position and a ready position,
- a release lever movably placed on the tension lever which can take up a coasting brake position and a disengaging position,
- a Bowden cable the actuation of which causes a relative movement of the release lever and of the tension lever against the action of the restoring force of a spring member,
- a brake which is operatively connected with the release lever in such a way that the saw chain is released only when the tension lever is in the ready position and the release lever in the disengaging position.

BACKGROUND OF THE INVENTION

Motor chain saws with a so-called back kick brake are known by the prior art since a long time. For these saws, the run of the saw chain is stopped for safety reasons when a dangerous situation takes place. Such a dangerous situation is generally recognized or defined in that a jerk movement takes place with a high acceleration of the saw (back kick). Due to its inertia of mass, the hand-guard releases the brake device for the saw chain. Such a release can also take place directly by manually actuating the hand-guard.

The braking of the saw chain takes place by a brake device generally in such a way that a brake band which winds round a coupling drum is tightened and thus the rotation of the coupling drum is stopped by friction. The coupling drum is connected free of rotation with a chain wheel which drives the saw chain.

The brake device can also be actuated independently from the back kick brake with a supplementary brake device known as a coasting brake in a second way.

The coasting brake is to avoid that the saw chain coasts for a certain time (typically for a few seconds) after having disconnected the drive because of the inertia of mass of the drive. This coasting can cause namely a damage of the saw chain when laying down the device. Moreover, the coasting constitutes an endangering potential for the user of the saw. A coasting brake is useful and necessary independently of the fact if it is a motor saw with an electric motor or an internal combustion engine. The actuation of the coasting brake is generally coupled with the gas pedal to be actuated by the user or with the locking key with which the gas pedal can be stopped. This means that, when pulling through the gas pedal (“stepping on the accelerator”), the coasting brake is disengaged so that the saw chain can rotate. Inversely, when releasing the gas pedal, the brake is immediately actuated and the run of the saw stopped. A coupling of the coasting brake functions similarly with the locking key. The coasting brake is released only when the locking key is pressed.

SUMMARY OF THE INVENTION

The aim of this invention is to work out a motor chain saw with the brake device mentioned in the introduction in combination with a supplementary brake device known as a coasting brake. The design priority should be a compact construction and a high safety of function.

This aim is achieved by the characteristics indicated in claim 1.

The brake device of the motor chain saw thus has a construction consisting of a tension lever, a release lever, a Bowden cable and a brake of the type explained in the introduction and known from the prior art. According to the invention, it is characterized in that the tension lever is placed linearly slidable with respect to the housing of the motor chain saw and that the release lever is also placed linearly slidable with respect to the tension lever, the two mentioned movement axles of the displacement being appropriately parallel to each other.

This has the advantage that a compacter construction can be achieved since no space is necessary for providing long lever arms. Moreover, the linearity of the movements allows that the tension lever and the release lever can be placed at least partially in the inside of the spring(s) so that there is a further gain of space. The whole mechanism obtains a longish extension which can be surrounded by a protective housing in a simple way. This reduces the susceptibility of the mechanism to troubles from outside and thus contributes to a higher reliability of the brake system.

In a further development of the invention according to claim 2, the tension lever is pressed by a spring member into the brake position. When the tension lever is in the brake position, the saw chain is not disengaged, i.e. it is braked. Due to the effect of the spring member, the brake device thus tends to take up the safe position in which the saw chain is braked. Furthermore, due to the effect of the spring member, it is guaranteed that already low forces can be sufficient to release the back kick brake since the main energy is made available by the spring member for moving the tension lever.

A brake device of the last mentioned type with a spring member on the tension lever can be further developed according to claim 3 so that the tension lever is held in the ready position by an articulated lever connected with the hand-guard of the motor chain saw against the pressure of the spring member. An articulated lever is an element substantially consisting of two segments, whereby the segments are connected with each other over a hinged articulation. The segments can be moved into an extended position in which the angle of the articulated lever is 1800 or slightly more and a further extension is avoided by a stopper. This extended position of the articulated lever is stable against axial forces of pressure, a relatively low force onto the knee link in vertical direction to the articulated lever axle can however cause the collapse of the articulated lever. The articulated lever can thus be used in the extended position to held the tension lever in the ready position against the high force of the spring member. A relatively low force transmitted by the hand-guard to the articulated lever can then however cause the collapsing of the articulated lever so that the tension lever can move under the action of the elastic force immediately and unhindered from the ready position into the brake position. A stop of the saw chain is thus achieved by the brake.

Moreover, the above described connection of the tension lever with a spring member can be further developed according to claim 4 so that the release lever which is in a disengaging position, fixed to the tension lever but linearly movable is operatively connected with said spring member. For example, the release lever can have a direct contact with the spring member. This construction measure has the advantage that in the disengaging position of the release lever the force of the spring member can be directly transmitted to the release lever. Should it thus come to a release of the back-kick brake with which the force of the spring member is released, this force can act directly and without intermediate elements onto the release lever and thus onto the brake. Additional time delays due to the intermediate elements are avoided here. Furthermore, the safety of the system is increased since the intermediate elements are avoided as possible sources of error.

BRIEF DESCRIPTION OF THE INVENTION

The invention will be explained as an example with reference to the figures.

FIG. 1 represents the mounting position.

FIG. 4 represents the lever positions after a chain back kick.

DESCRIPTION OF THE PREFERRED EMBODIMENT

Figure 1:
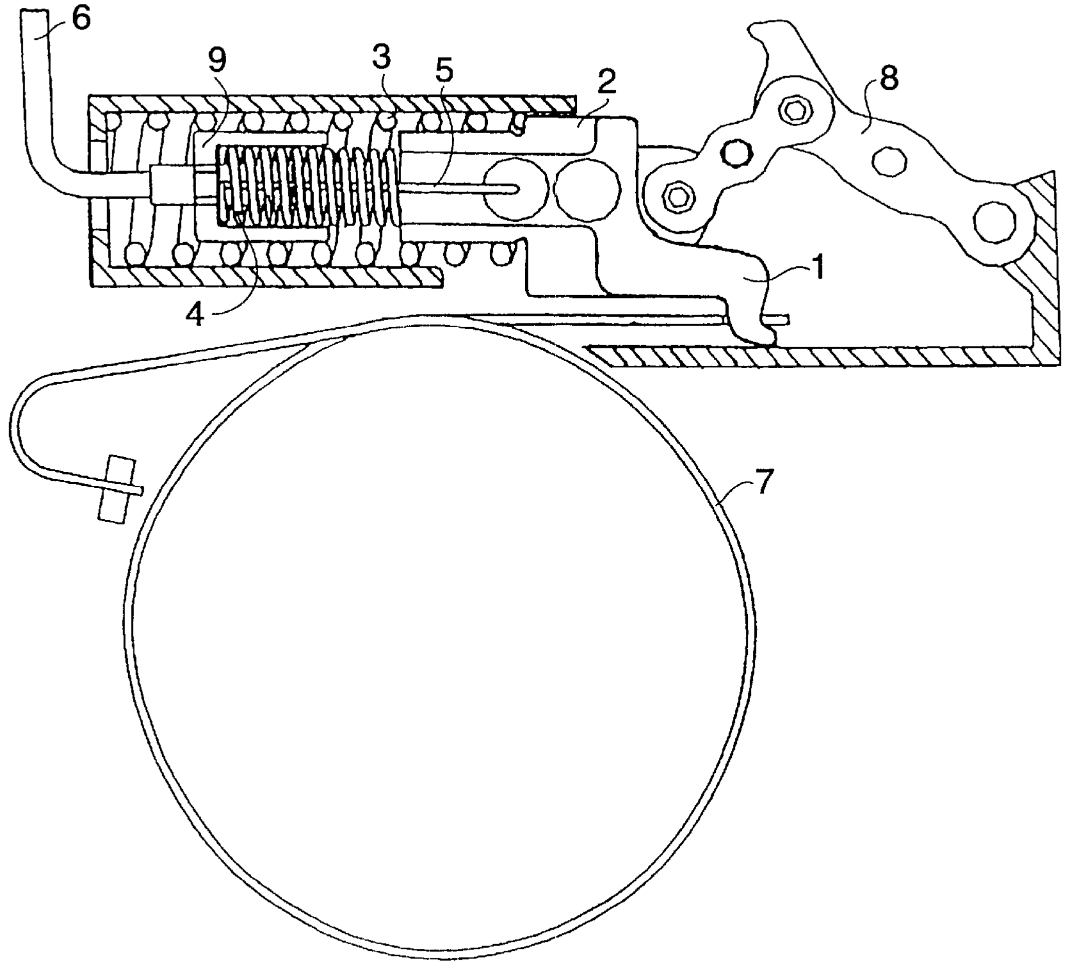
FIG. 1 shows a cross-section through a chain brake device according to the invention with the tension lever 2 in brake position and the release lever 1 in coasting brake position.

The chain brake device represented in FIGS. 1 to 5 for a motor chain saw with an electric motor or carburetor motor embodies the function of a back kick brake as well as of a coasting brake. The proper brake action is generated by a brake band 7 which winds itself around a coupling drum (which is not represented). A gear ring is connected with the coupling drum, gear ring on which the saw chain is located which is still guided over the saw sword (which is not represented). A rotation of the coupling drum and thus of the saw chain can thus be stopped by tightening the brake band 7 so that it is put closely on the coupling drum and it stops the latter because of the frictional forces. The brake band 7 is fixed to one end on the housing of the motor chain saw while the other end is connected with the release lever 1. A tightening of the brake band 7 and thus a brake effect takes places when the release lever 1 is moved to the corresponding position (on the right in FIGS. 1 to 4).

The operation of the chain brake device according to the invention will be described below first by means of the schematized FIG. 6. Accordingly, the chain brake device contains the tension lever 2 as an important element which is linearly slidable in horizontal direction between a ready position b and a brake position B. The release lever 1 is placed on the tension lever 2. This release lever 1 is also slidable with respect to the tension lever, namely between a disengaging position f and a release position A. The linear displacement directions of the tension lever 2 and of the release lever 1 are parallel to each other, a displacement of the release lever 1 overlying the displacement of the tension lever 2. The release lever 1 is connected with a brake for the saw chain in a way which is not represented in detail in FIG. 6, whereby this brake releases the saw chain only when the tension lever 2 and the release lever 1 are as far on the left as possible. This means that the tension lever 2 must be in the ready position b and the release lever 1 in the disengaging position f. If one of the two levers is in another position, the brake is stopped and the chain cannot rotate.

The displacement of the release lever 1 between the disengaging position f and the coasting brake position A takes place over a Bowden cable which consists of a Bowden cable cover 6 and a Bowden cable core 5. The latter is fixed with its non-represented end to an operating element of the motor chain saw which can be in particular the gas pedal or the locking key. When actuating one of these elements, a traction is exerted onto the Bowden cable core 5 (arrow in FIG. 6). This traction is transmitted to the release lever 1 to which the other end of the Bowden cable core 5 is fixed. The release lever 1 is thus moved from the coasting brake position A to the disengaging position f, what takes place against the active restoring force of a spring 4. When the traction on the Bowden cable core 5 is released, the spring 4 drives the release lever 1 back into the coasting brake position A so that in any case (independently of the position of the tension lever 2) the saw chain is braked. This is desired in order to stop a coasting of the saw chain.

The restoring force of a spring 3 preferably also acts onto the tension lever 2, this spring pushing the tension lever from the ready position b back into the brake position B. The tension lever 2 can be held against the force of the spring 3 in the ready position b, when the articulated lever 8 is stretched. However, a low force onto the articulation of the articulated lever 8 is then sufficient to let collapse this articulated lever so that the force of the spring 3 can act and move the tension lever 2 into the brake position B. Independently from the position of the release lever 1 (disengaging position f or coasting brake position A), in the brake position B the saw chain is braked in any case. A collapsing of the articulated lever 8 can be caused for example by a movement of the hand-guard (not represented) which takes place when the saw makes a jerk or when, for other reasons, a shock or a knock ensues on the hand-guard. The moving of the tension lever 2 from the ready position b into the brake position B due to the collapse of the articulated lever 8 realizes the function of the back kick brake.

Due to the fact that the Bowden cable cover 6 rests on the tension lever 2, the Bowden cable cover 6 and the Bowden cable core 5 take part in a sliding movement of the tension lever 2 in like manner. This means that no load transmission takes place over the Bowden cable core 5 by a response of the back kick brake to the gas pedal or the locking key of the motor saw. A disturbance, irritation or even an injury of the motor chain saw user is thus avoided.

Figure 6:
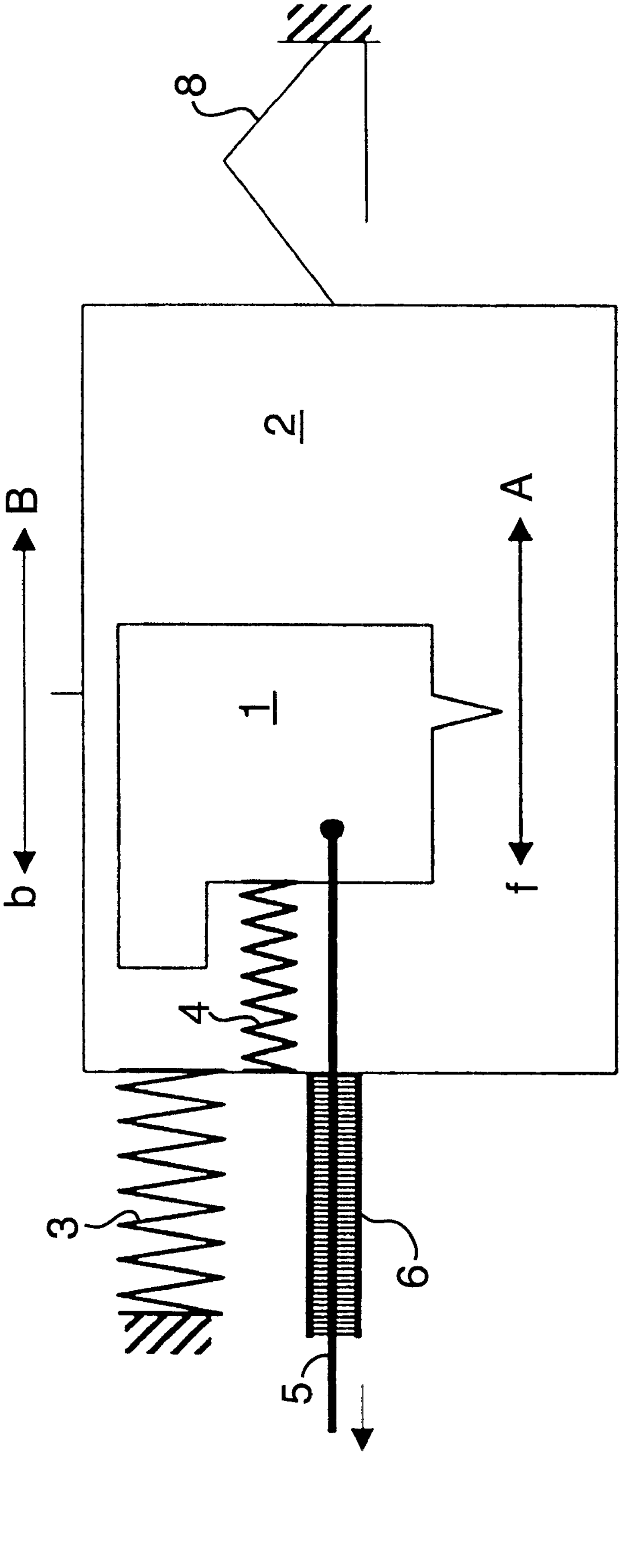
FIG. 6 shows a schematic representation of the effect of the chain brake device.

Furthermore, from the schematic representation in FIG. 6, we can see that the release lever 1 in the disengaging position f directly adheres to the spring 3. Should it come to a response of the back kick brake for this reason, the force of the releasing spring 3 is directly transmitted without intermediate elements to the release lever. Thus, time delays are avoided and a higher safety of function is achieved.

The explanations given above with reference to the schematic FIG. 6 apply in the same way to the concrete system represented in the FIGS. 1 to 5. Hereinafter reference is made to these figures.

In FIG. 1 the situation is represented in which the tension lever 2 is in the brake position (recognizable by the collapsed articulated lever 8) and the release lever 1 in the coasting brake position (recognizable by the extended spring 4). The release lever 1 is situated as far on the right as possible so that a corresponding big traction is exerted onto the brake band 7 and the saw chain is thus stopped. The hand-guard is in the released position, the articulated lever member 8 and thus the preloaded pressure spring 3 are in the released position. There is a direct operative connection preloaded pressure spring 3—release lever 1—brake band 7 so that only a few components are loaded. The brake band spring 4 is held in the extended position because of the released preloaded pressure spring 3 and thus of the position of the tension lever 2 and of the release lever 1 the one with respect to the other, the Bowden cable to the gas pedal or to the locking key is loose.

Figure 2:
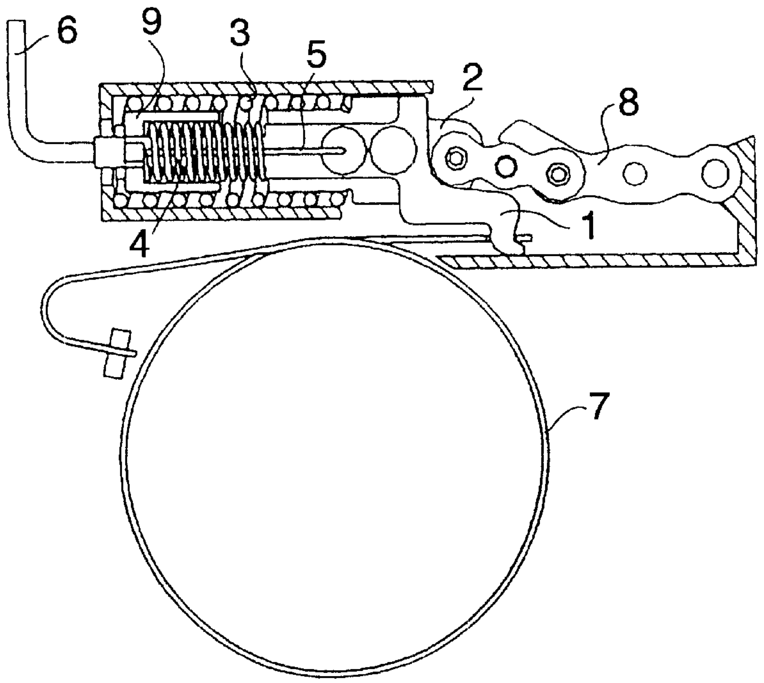
FIG. 2 shows the brake device according to FIG. 1 with the tension lever 2 in ready position and the release lever 1 in coasting brake position.

FIG. 2 shows the lever position when the gas pedal and/or the locking key is not actuated. Contrary to FIG. 1, the back kick brake is tensed, i.e. the tension lever 2 is in the ready position (recognizable by the articulated lever 8 pushed through). By tensioning the back kick brake, the articulated lever member 8 is moved by the linking points of the hand-guard into a pushed-through position, the preloaded pressure spring 3 being tensioned by means of the tension lever 2. During the tensioning process the brake band spring 4 can release because of the clearance in the Bowden cable and the release lever I remains in the released position (coasting position) so that the brake band 7 is stopped with the reduced brake force of the brake band spring 4.

Figure 3:
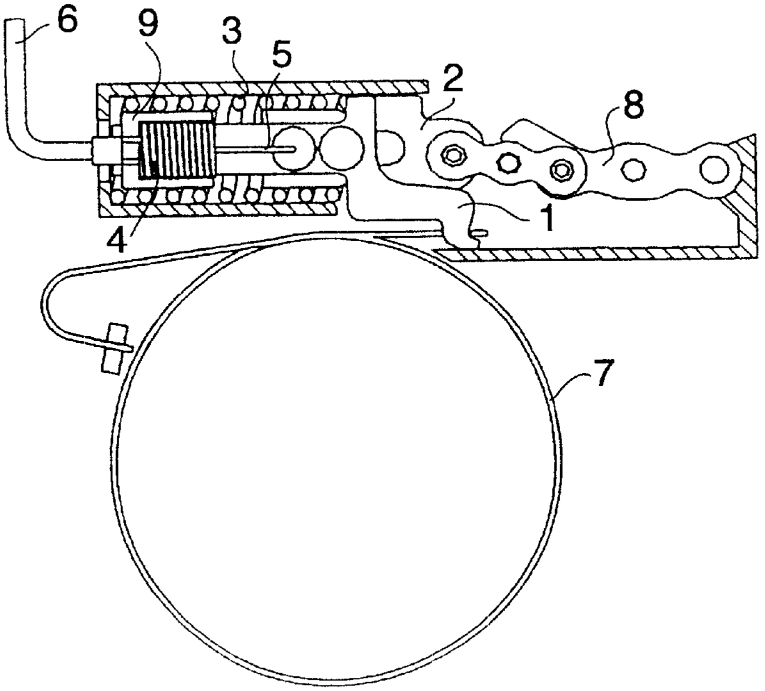
FIG. 3 shows the chain brake device according to FIG. 1 with the tension lever 2 in ready position and the release lever 1 in disengaging position.

FIG. 3 represents the lever positions with the saw being working. The user tensions the brake band spring 4 over the gas pedal or the locking key due to the direct operative connection of these elements with the release lever 1 by means of the Bowden cable so that the brake band 7 releases the rotation of the coupling drum. Here it is important that the bearing faces of the release lever 1 are moved as far as direct to the preloaded pressure spring 3, whereby only a slight clearance remains as tolerance compensation.

Figure 4:
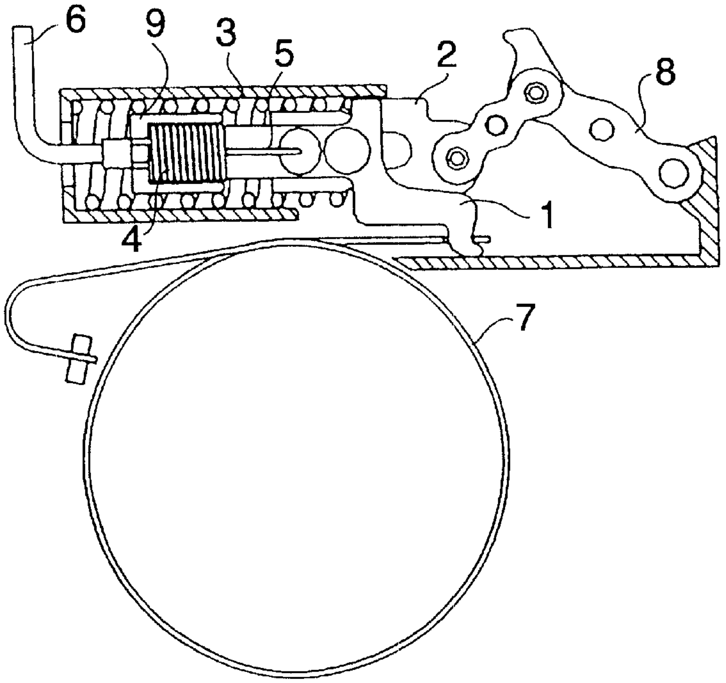
FIG. 4 shows a chain brake position according to FIG. 1 with the tension lever 2 in brake position and the release lever 1 in disengaging position.

In FIG. 4 the situation is represented in which, starting from a state according to FIG. 3, the back kick brake is released (back kick). The articulated lever member 8 is released and the preloaded pressure spring 3 can release. The bearing faces of the release lever 1 which are directly in front of the end of the preloaded pressure spring are caught and the brake band 7 is tensioned. The saw chain is thus stopped. Since the Bowden cable cover 6 with the Bowden cable core fixed on the spring housing 9 run parallel, the gas pedal or the locking key does not undergo any reaction power from the release of the back kick brake.

Starting from the situation according to FIG. 2 (back kick brake tensioned, i.e. tension lever 2 in ready position; gas pedal not actuated, i.e. release lever 1 in coasting brake position), we can also consider the situation in which the back kick brake is released for example for test purposes. Here, the articulated lever member 8 is released, the tension lever 2 does not held the preloaded pressure spring 3 in the position any longer so that this spring can release its energy. Then, the tension lever 2 bounces up driven by the preloaded pressure spring 3, the latter hooks after a partial release on the bearing surfaces of the release lever 1 and thus increases the brake force of the brake band. There is no reaction power onto the operating handle (locking key/gas pedal) for the reasons explained above.

Figure 5A:
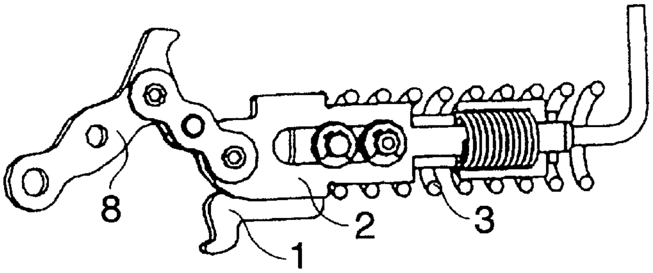
FIGS. 5A and 5B show two perspective views of the chain brake device according to the FIGS. 1 to 4.
Figure 5B:
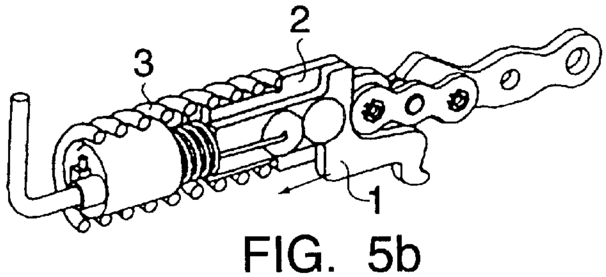

In FIG. 5, the brake device is represented according to FIGS. 1 to 4 in two perspective views with partially omitted preloaded pressure spring 3. The upper representation shows the tension lever in the brake position (articulated lever collapsed) and the release lever in the disengaging position (gas pedal depressed). The lower representation shows the tension lever in the ready position (articulated lever pushed through) and the release lever in the coasting brake position (brake band spring released). The upper representation thus shows the brake device under the sole effect of the back kick brake, the lower representation under the sole effect of the coasting brake.

Reference Numerals:

1 Release lever
2 tension lever
3 preloaded pressure spring
4 brake band spring
5 bowden cable core
6 bowden cable cover
7 brake band
8 articulated lever
b ready position
B brake position
f disengaging position
A coasting brake position

What is claimed is:

1. A motor chain saw with a chain brake device releasable as a back kick brake and as a coasting brake comprising a tension lever (2) movable with respect to housing of the motor chain saw which can be moved between a brake position (B) and a ready position (b), a release lever (1) which can take up a coasting brake position (A) and a disengaging position (f), a Bowden cable which ensures a relative movement of the tension lever and of the release lever, the Bowden cable moving the release lever (1) against the action of the restoring force of a spring member (4) from the coasting brake position (A) to the disengaging position (f), a brake (7) which is operatively connected with the release lever (1) in such a way that a saw chain of the motor chain saw is released only when the tension lever (2) is in the ready position (b) and the release lever in the disengaging position (f), characterized in that the tension lever (2) is placed linearly slidingly movable with respect to the housing of the motor chain saw and that the release lever (1) is placed linearly slidingly movable with respect to the tension lever (2), whereby both axles of the sliding movements are parallel to each other.

2. A motor chain saw according to claim 1, characterized in that the sliding movements of the tension lever (2) and of the release lever (1) are parallel to each other.

3. A motor chain saw according to claim 1, characterized in that the tension lever (2) is pushed into the brake position (B) by a spring member (3).

4. A motor chain saw according to claim 3, characterized in that the tension lever (2) is held in the ready position (B) by an articulated lever (8) connected with a hand-guard of the motor chain saw against the pressure of the spring member (3).

5. A motor chain saw according to claim 3, characterized in that the release lever (1) in the disengaging position (f) is operatively connected with the spring member (3).

* * * * *